United States Patent
Schneider

(10) Patent No.: US 6,431,755 B1
(45) Date of Patent: Aug. 13, 2002

(54) DRIVE TRAIN FOR USE WITH A KNEADER APPARATUS

(76) Inventor: Loren T. Schneider, 19828 Irongate Ct., Northville, MI (US) 48167

( * ) Notice: Subject to any disclaimer, the term of this patent is extended or adjusted under 35 U.S.C. 154(b) by 0 days.

(21) Appl. No.: 09/637,224

(22) Filed: Aug. 11, 2000

(51) Int. Cl.$^7$ ............................................... F16C 31/04
(52) U.S. Cl. ........................................ 384/50; 384/558
(58) Field of Search .............................. 384/50, 7, 558, 384/461, 584

(56) References Cited

U.S. PATENT DOCUMENTS

| | | | |
|---|---|---|---|
| 3,618,903 A | 11/1971 | Ronnoer et al. | 259/102 |
| 3,788,609 A | 1/1974 | Toczyski | 259/5 |
| 5,391,000 A | 2/1995 | Taniguchi | 366/332 |

OTHER PUBLICATIONS

Buss AG, Pratteln Switzerland, Buss Kneader MKS Modular Series (brochure), date unknown—at least as early as October 1998.

Primary Examiner—Lenard A. Footland
(74) Attorney, Agent, or Firm—Warn, Burgess & Hoffmann, P.C.

(57) ABSTRACT

A drive train for use a kneader apparatus of the type using a gearbox housing a drive train used to power or drive a mixing shaft or screw member in both an axial and rotary manner. The drive train includes a pivot arm pivotally supported within the gearbox and attached to an eccentric located on the output shaft. Since the pivot arm is fixed at a discrete pivot point, when the output shaft rotates, the eccentric causes the output shaft to reciprocate along the longitudinal axis of the output shaft. The pivot arm is supported on the housing by a first bearing assembly and a second bearing assembly. The first bearing assembly engages the pivot arm and the second bearing assembly engages the housing. A bearing shaft is disposed between and engages the first and second bearing assemblies. The bearing shaft is operative to drive the bearing assemblies to correspondingly provide both uniform distribution of load on the bearing assemblies and hydrodynamic lubrication to ensure smooth and efficient operation of the drive train.

20 Claims, 5 Drawing Sheets

DRIVE TRAIN FOR USE WITH A KNEADER APPARATUS

BACKGROUND OF THE INVENTION

1. Field of the Invention

The present invention relates generally to a drive train for use with a kneader apparatus and, more specifically, to an improved bearing assembly for supporting a portion of the drive train.

2. Description of the Related Art

Kneaders or mixing machines are typically used to knead, mix or compound a polymeric material. Typically, such machines include a mixing chamber. Inserted into the mixing chamber is a shaft or screw member that both rotates and reciprocates to mix material contained or placed within the mixing chamber. A gearbox houses a drive train used to power or drive the shaft or screw member. The drive train receives a rotational input, typically from an electric motor, and translates that rotary input into a rotary and reciprocal output. Accordingly, the shaft or screw member is coupled to the output of the gearbox.

One type of drive system used to impart axial motion to the shaft or screw member includes providing an eccentric on the output shaft. A pivot arm is pivotally attached within the gearbox and attaches to the eccentric on the output shaft. As the pivot arm is fixed at a discrete pivot point, when the output shaft rotates, the eccentric causes the output shaft to reciprocate back and forth along the longitudinal axis of the output shaft.

One manner of supporting the pivot arm within the gearbox is the use of a spherical plain bearing. However, such bearings are limited by contact pressure (p) and sliding the velocity (v); i.e., the amount of load the bearing can support and how fast the bearing surfaces move.

For spherical plain bearings constructed with both sliding contact surfaces of hardened steel, the recommended contact pressure (p) range is 1 N/mm$^2$ to 100 N/mm$^2$ and the recommended sliding velocity range (v) is 1 mm/sec to 100 mm/sec. However, the product of the contact pressure (p) and sliding velocity (v), the pressure velocity (p·v) value has a recommended range of 1N/mm$^2$·mm/sec to 400 N/mm$^2$·mm/sec. Therefore, spherical plain bearings are suitable for high contact pressure (p) at low sliding velocity (v) or low contact pressure (p) at high sliding velocity(v). Thus there remains a need in the art for a drive train capable of driving the output shaft at high rotation speeds and corresponding rapid reciprocation with a high degree of mechanical reliability.

SUMMARY OF THE INVENTION

The present invention is a drive train for use with a kneader apparatus. The drive train includes an input shaft rotatably supported in a housing. An output shaft is supported by the housing for rotational and axial movement. A pivot arm is pivotally attached on one end to the housing and engages the output shaft at the opposite end. Upon rotation of the output shaft, the pivot arm operates to drive the output shaft in a reciprocating manner. The reciprocal motion is in addition to the rotating motion. The pivot arm is pivotally supported on the housing by a first bearing assembly and a second bearing assembly. The first bearing assembly engages the pivot arm and the second bearing assembly engages the housing. A bearing shaft is disposed between and engages the first and second bearing assemblies. The bearing shaft is operative to drive the bearing assemblies.

One advantage of driving the bearing assemblies is that it rotates the bearings and correspondingly provides uniform distribution of load on the bearings and along with hydrodynamic lubrication to ensure smooth and efficient operation of the kneader. Accordingly, the present invention provides a kneader that operates at higher speeds and thereby increases the output of the kneader.

Other features and advantages of the present invention will be readily appreciated as the same becomes better understood after reading the subsequent description taken in conjunction with the accompanying drawings.

DETAILED DESCRIPTION OF THE PREFERRED EMBODIMENT(S)

Figure 1:
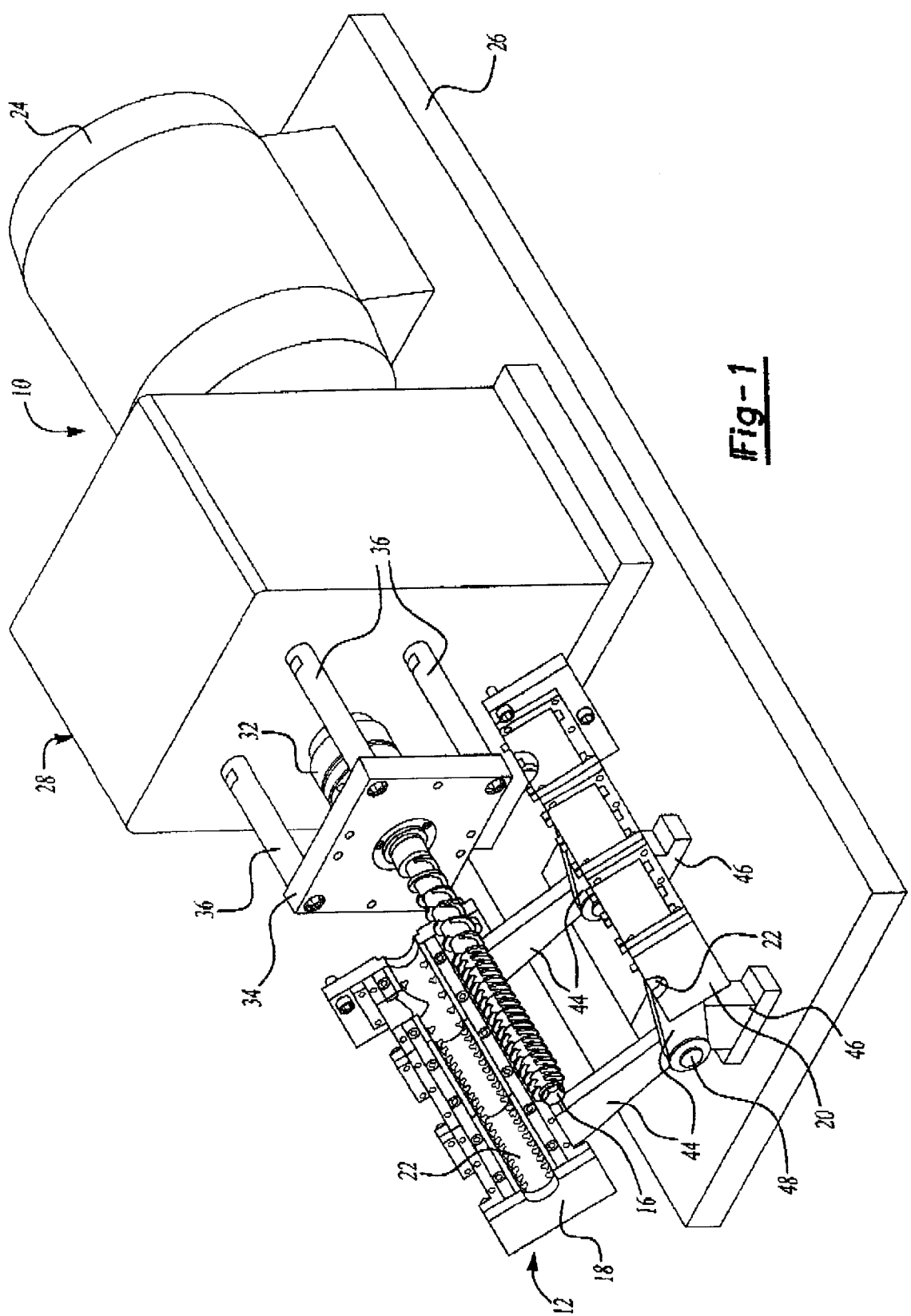
FIG. 1 is a perspective view of a kneader utilizing a drive train according to the present invention.

Turning now to FIG. 1, a kneader 10 including an enclosure 12, defining a mixing chamber and a kneader screw 16 is shown. As is commonly known, the kneader screw 16 is driven such that it moves within the mixing chamber in both a rotary and reciprocal manner. The enclosure 12 is shown in an open position wherein the respective first and second enclosure sections or halves 18, 20 are separated from one another. Each of the first and second enclosure sections 18, 20 has a cavity 22 located therein. It should be understood that when the enclosure 12 is in a closed position; i.e., the first and second enclosure sections 18, 20 are secured adjacent one another, the cavities 22 in each of the first and second enclosure sections 18, 20 cooperate together to define the mixing chamber. In the preferred embodiment, the cavities 22 have a semi-cylindrical shape. Accordingly, the mixing chamber is cylindrical when the first and second enclosure sections 18, 20 are placed in the closed position. As used herein, the terms "kneader," "extruder" or "mixer" refer to any rotary/reciprocating shaft mixer used to knead, extrude, mix or compound various materials including polymeric materials.

The kneader 10 includes a motor 24 secured to a base 26. A gearbox 28 secured to the base 26 receives a rotary input (see arrow 27) from the motor 24 through an input shaft 25 and generates a rotary and reciprocal output at an output shaft 30. A coupling 32 connects the kneader screw 16 to the output shaft 30 of the gearbox 28. It follows that the output shaft 30 drives the kneader screw 16 in a rotary (see arrow 38) and reciprocal (see arrow 40) manner. A support plate 34 secured by support bars 36 to the gearbox 28 supports the kneader screw 16 for rotational and reciprocal motion.

The enclosure 12 is also secured to the base 26. As shown in FIG. 1, arms 44 are connected to each of the first and second enclosure sections 18,20 of the enclosure 12. Posts 46 are attached to the base 26. Pivot pins 48 pivotally connect and support the arms 44 on the posts 46. Accordingly, the respective first and second enclosure sections 18, 20 of the enclosure 12 separate to open the enclosure 12 and allow access to the mixing chamber.

Figure 2:
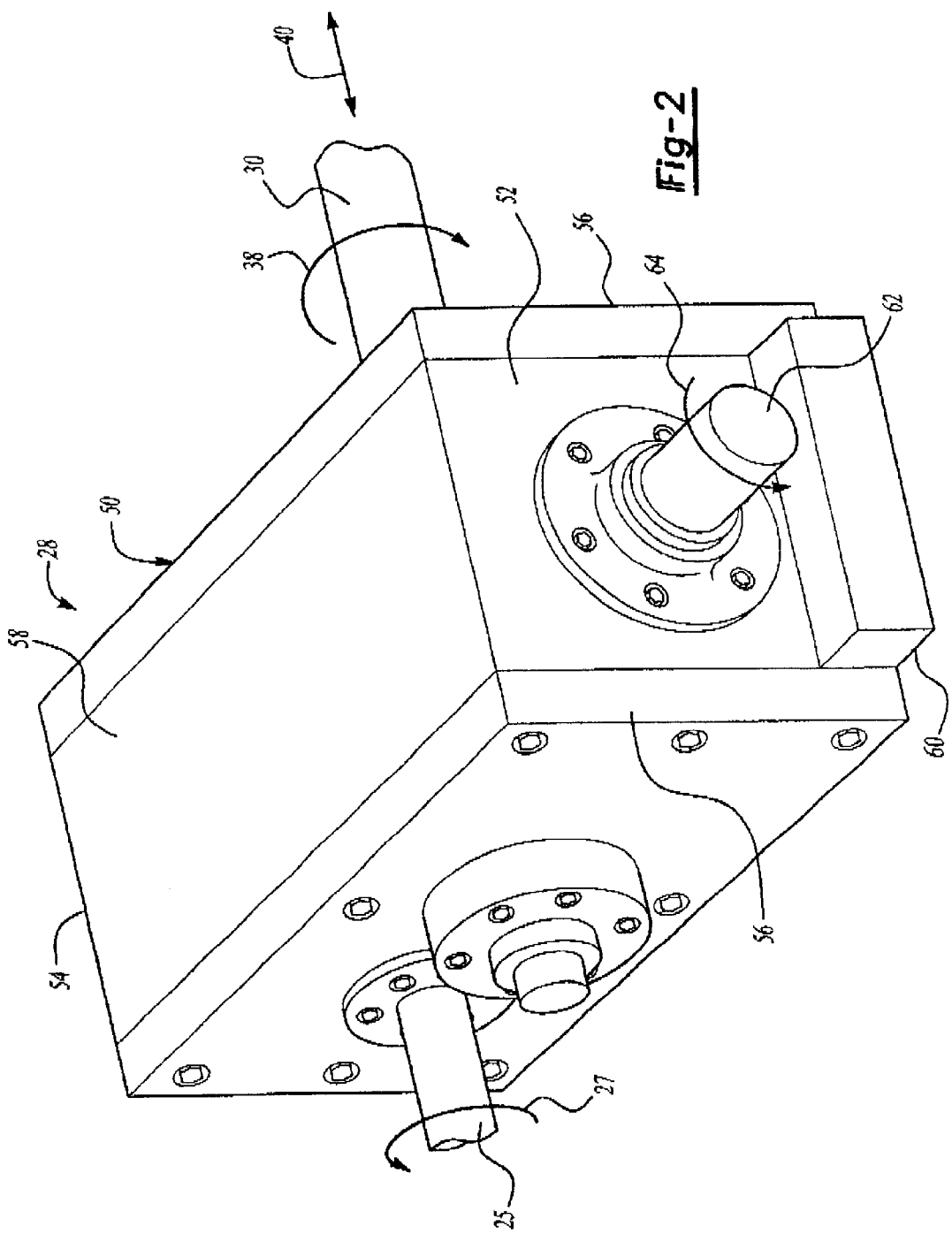
FIG. 2 is a perspective view of a gearbox containing a drive train according to the present invention.

FIG. 2 further illustrates the gearbox 28 seen generally in FIG. 1. The gearbox 28 includes a housing 50 formed of a front wall 52 and a rear wall 54 interconnected by side walls 56. A top surface 58 and a bottom surface 60 connect the respective front 52, rear 54 and side 56 walls to form the housing 50. It should be appreciated that the housing 50 is a sealed container containing a lubricant for lubricating the many moving parts contained within the housing 50. In addition to the input shaft 25 and the output shaft 30, the gearbox 28 further includes a bearing shaft 62. The bearing shaft 62 is coupled to a power source or drive motor (not shown) which rotates the bearing shaft 62 in the direction shown by arrow 64.

Figure 3:
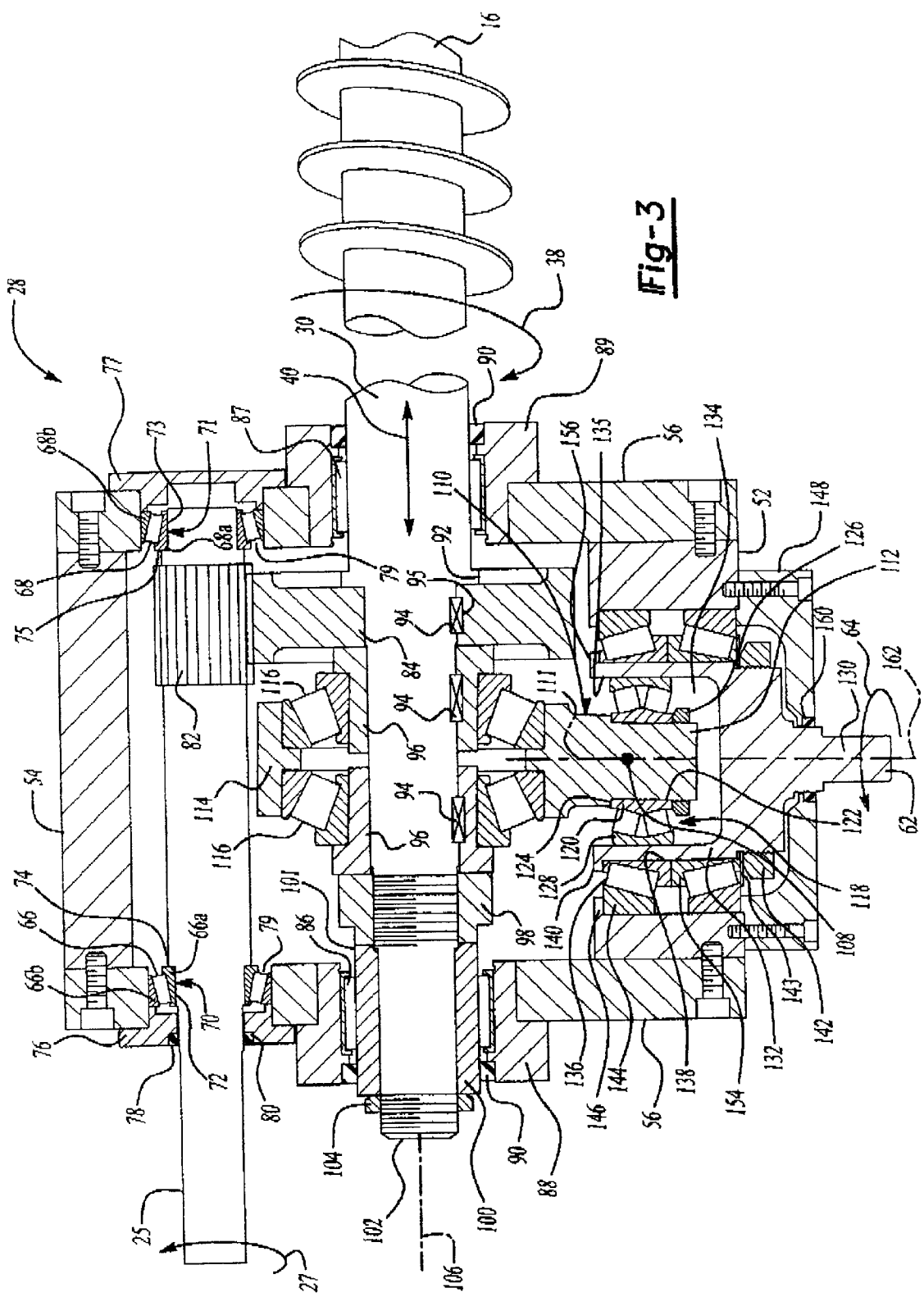
FIG. 3 cross-sectional view of the gearbox of FIG. 2 taken along lines 3—3 of FIG. 2.

Turning now to FIG. 3, there is shown the drive train of the gearbox 28 used to translate the rotary motion of the input shaft 25 to the rotary and reciprocal motion of the output shaft 30. As shown, the input shaft 25 is supported for rotation in the respective side walls 56 by first and second radial input shaft bearings 66, 68. The input shaft 25 includes reduced diameter sections 70,71 defining bearing surfaces 72,73. The reduced diameter sections 70, 71 form shoulders 74, 75 on the input shaft 25. The inner races 66a, 68a of the radial input shaft bearings 66, 68 are disposed on respective bearing surfaces 72, 73. Each inner race 66a, 68a engages the respective shoulders 74, 75. The outer races 66b, 68b of the radial input shaft bearings 66, 68 are positioned in apertures 79 located in the side walls 56. Retainers 76,77 are inserted into the apertures 79 and engage the outer races 66b, 68b to secure the input shaft 25 in position on the housing 50. An oil seal 78 disposed in an oil seal groove 80 operating to seal the input shaft 25 and prevent lubricant from exiting the gearbox 28. A spur type drive gear 82 is secured to or integral with the input shaft 25. The spur type drive gear 82 meshes with a spur type driven gear 84 secured to the output shaft 30.

Turning now to the output shaft 30, a pair of output shaft bearings 86, 87 support the output shaft 30 for both rotational and reciprocal motion. While the output shaft bearings 86, 87 are shown in FIG. 3 as radial bearings, this is for illustration purposes only. In practice, any bearing that can support the output shaft 30 during rotation and allow for axial displacement of the output shaft 30 is suitable. Accordingly, a plain journal bearing, i.e., a bronze bushing, a cylindrical roller bearing or a needle type bearing can be used. The output shaft bearings 86, 87 are supported on the side walls 56 of the housing 50 by output shaft retainers 88, 89. Each of the output shaft retainers 88,89 including an oil seal 90 that retains lubricant within the housing 50. The spur type driven gear 84 is secured to the output shaft 30, typically through a key 94 disposed in a groove 95 on the output shaft 30. An annular shoulder 92 on the output shaft 30 provides positive stop for the spur type driven gear 84 and properly positions the spur type driven gear 84 to mesh with the spur type drive gear 82. Accordingly, rotation of the input shaft 25 causes rotation of the output shaft 30.

A pair of eccentric hubs 96 are secured by keys 94 to the output shaft 30 adjacent the spur type driven gear 84 to impart reciprocal motion to the output shaft 30 in the direction shown by arrow 40. A lock nut 98 secures the eccentric hubs 96 in place on the output shaft 30. A bushing 100 disposed over the free end 102, i.e., the end of the output shaft 30 opposite the coupling 32, provides a bearing surface 101 that engages the output shaft bearing 86. The bushing 100 also forms a spacer that aligns the various components secured to the output shaft 30. A lock nut 104 secured to the free end 102 of the output shaft 30 retains the various components on the output shaft 30. The eccentric hub 96 has a defined cam angle; i.e., the angle of eccentricity with respect to the longitudinal axis 106 of the output shaft 30. The magnitude of the cam angle coupled with the distance to a pivot point 108 determines the amount of axial displacement or reciprocal motion of the output shaft 30. Such a mechanism is known to those skilled in the art. As is known with such devices, a pivot arm 110, including an arm portion 112 and a yoke portion 114, is secured to the eccentric hub 96 by yoke bearings 116 positioned within the yoke portion 114 and engaging the eccentric hub 96. The yoke bearings 116 used to attach the pivot arm 110 to the eccentric hub 96 are combination axial/radial bearings that are designed to support both axial and radial loads in both the forward and reverse direction of reciprocal motion.

As set forth above, the eccentric hub 96 and the spur type driven gear 84 are fixed to the output shaft 30 by keys 94. Accordingly, rotation of the input shaft 25 and corresponding spur type drive gear 82 impart rotational motion to the output shaft 30 through the spur type driven gear 84. As the output shaft 30 rotates, the eccentric hub 96 also rotates within the yoke bearings 116 supported in the yoke portion 114 of the pivot arm 110. As seen in FIG. 3, the pivot arm 110 is fixed at a discrete pivot point 108. Since the pivot arm 110 is constrained and can only move about the pivot point 108, rotation of the eccentric hub 96 within the yoke portion 114 of the pivot arm 110 causes the output shaft 30 to move in a reciprocal manner along its longitudinal axis 106.

Figure 4:
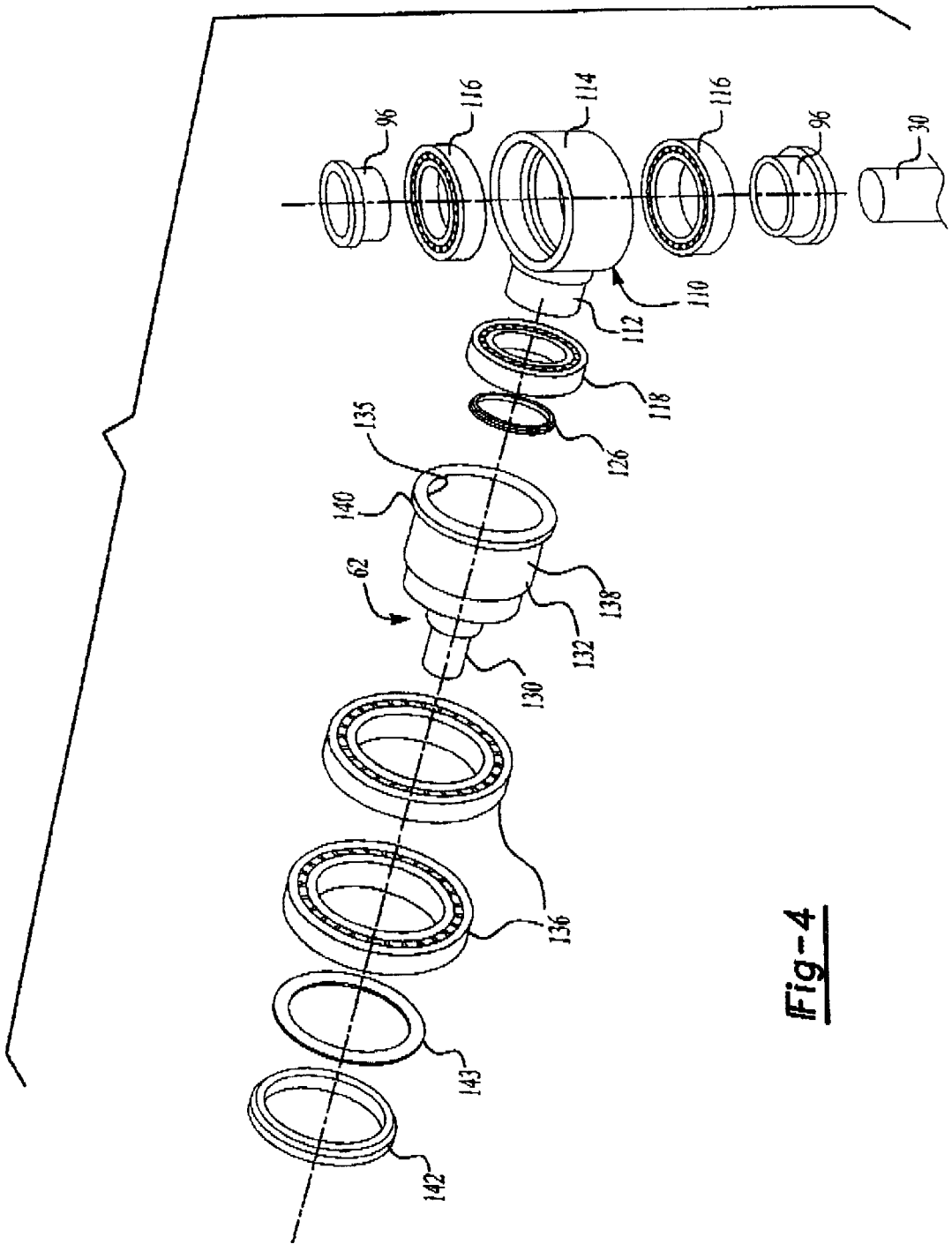
FIG. 4 an exploded view of the pivot arm and bearing assembly for use with the drive train according to the present invention.

Pursuant to the present invention, the pivot arm 110 moves back and forth or tilts as the output shaft 30 reciprocates along its longitudinal axis 106. In addition, the pivot arm 110 also swivels about its longitudinal axis 111 as the output shaft 30 reciprocates. Accordingly, the pivot arm 110 is supported for such movement by a first bearing assembly or pivot bearing 118. As shown in FIGS. 3–4, an inner race 120 of the pivot bearing 118 is positioned on a bearing surface 122 of the arm portion 112 and seated against a shoulder 124. A lock nut 126 secures the inner race 120 on the bearing surface 122 of the arm portion 112. As set forth below, an outer race 128 of the pivot bearing 118 engages the bearing shaft 62. Pursuant to the invention, the bearing shaft 62 is rotatably supported within the housing 50. The pivot bearing 118 is a self-aligning bearing that will tolerate misalignment; i.e., any misalignment between the centerline of the outer race and the inner race is automatically adjusted. Various types of self-aligning bearings are known in the art, for example spherical roller bearings and self-aligning ball bearings.

Normally, commercial self-aligning bearings allow for a range of up to 3 degrees of movement or misalignment. If the ball or roller moves or tips too far, it will travel off of the outer race of the bearing. Accordingly, the self-aligning bearing can support a total pivot angle of up to 6 degrees, i.e., up to 3 degrees on each side of the bearing centerline. This is typical of the misalignment of commercial available self-aligning bearings. Custom bearings with greater tolerance of angular misalignment can be used when a greater pivot angle is required. Basically, such a custom bearing has an outer race having a greater concave or arcuate bearing surface that enables the ball or roller to pivot farther off of the bearing centerline while still maintaining contact with the outer race. Such bearings adequately support the pivot arm 110 as it swivels and tilts through a pivot angle of up to 6 degrees.

The bearing shaft 62 includes a drive shaft portion 130 and an enlarged cylindrical housing or bearing cup 132 defining an interior space or chamber 134. The drive shaft portion 130 and cylindrical housing or bearing cup 132 have a common longitudinal axis 162. As shown, the outer race 128 of the pivot bearing 118 is seated on an inner surface 135 of the cylindrical housing or bearing cup 132. Correspondingly, the entire pivot bearing 118 is supported within the cylindrical housing or bearing cup 132 of the bearing shaft 62. Accordingly, the pivot arm 110 pivots within the cylindrical housing or bearing cup 132 about the pivot point 108, positioned on the common longitudinal axis 162 of the drive shaft portion 130 and bearing cup 132.

A second bearing assembly or housing bearing 136 supports the cylindrical housing or bearing cup 132 for rotational movement about the longitudinal axis 162 of the bearing shaft 62. An inner race 154 of the housing bearing 136 contacts an outer surface 138 of the cylindrical housing 132. In the present embodiment, the inner race 154 and correspondingly the housing bearing 136, are placed on the cylindrical housing or bearing cup 132 and held in place on the outer surface 138 thereof by an outwardly extending annular lip 140 on the open end 156 of the bearing cup 132 and a lock nut 142 and washer 143 combination threadably received on the shaft end 158 of the bearing cup 132. The side wall of the housing 50 supports the outer race 144 of the housing bearing 136. Similar to the inner race 154, the outer race 144 of the housing bearing 136 is seated against an inwardly extending lip 146 of the housing 50 and held in place by a housing bearing retainer cap 148 connected to the front wall 52 of the housing 50. An oil seal 160 operates to seal the interface between the bearing shaft 62 and the bearing retainer cap 148 to contain lubricant within the housing 50.

As an example, the bearing shaft 62 can be rotated at a speed of approximately 200 rpm. The speed of rotation is based on the size of the bearing and the type of lubricant. Specifically, the rotation speed is that necessary to build up pressure underneath the bearing ball or roller to achieve hydrodynamic lubrication wherein the bearing ball or roller rolls on a film of lubricant and metal to metal contact is minimized. Thus, when the bearing shaft 62 rotates, it rotates the outer race 128 of the pivot bearing 118 to ensure hydrodynamic lubrication of the pivot bearing 118. Additionally, rotation of the outer race 128 spreads the load over the entire pivot bearing 118, to avoid brinelling of the outer 128 and inner 120 races of the pivot bearing 118. For this reason, the bearing shaft 62 rotates while the pivot arm 110 moves about pivot point 108.

It should be appreciated that the present invention operates to rotate at least one of the races, either the inner or outer race of the pivot bearing 118. While shown herein rotated by a bearing shaft 62 driven separately, other means of driving one of the bearing races are contemplated as part of the present invention. For instance, the drive shaft portion 130 of the bearing shaft 62 could be eliminated and the bearing cup 132 coupled to and driven by the output shaft 30 or some other drive means.

In addition, triple ring bearings are known and are within the scope of the present invention. Specifically, the present invention contemplates use of such a triple ring bearing. The inner ring of the triple ring bearing is driven such that the inner ring performs the same function as the bearing shaft; i.e., it operates to rotate the races of the respective bearings to spread the load over the entire bearing and ensure hydrodynamic lubrication of the bearing. Finally, although the first bearing assembly is shown as a pivot bearing and the second bearing assembly is shown as a support bearing, it is understood that both bearings can be pivot bearings.

Figure 5:
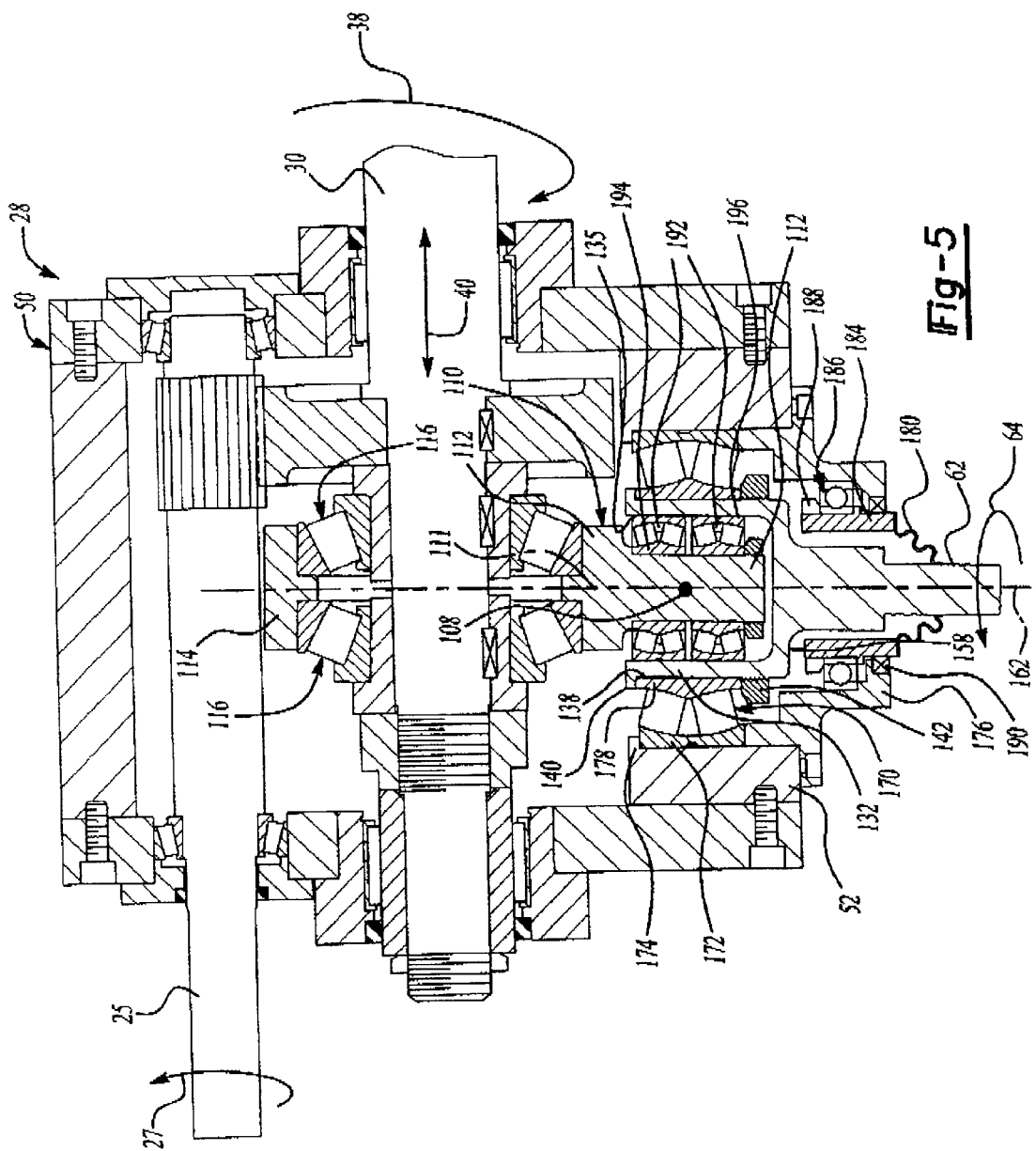
FIG. 5 is a cross-sectional view of an alternative embodiment of the gearbox of FIG. 2.

Turning now to FIG. 5, there is shown an alternative embodiment of the present invention. Similar to the previous embodiment, an input shaft 25 is used to drive an output shaft 30 and pivot arm 110 secured to the output shaft 30 by yoke bearings 116. It should be appreciated that the difference between the two embodiments lies in the manner in that the pivot arm 110 is supported in the housing 50. Once again, the arm portion 112 is supported for pivotal moment by a pivot bearing 170. As described earlier, the pivot bearing 170 is typically a self-aligning bearing that will tolerate misalignment. The pivot bearing 170 includes an outer race 172. The outer race 172 is secured within a front wall 52 of the housing 50 and is seated against an inwardly extending lip 174. A bearing retainer cap 176 is secured to the front wall 52 of the housing 50 and operates to hold the outer race 172 of the pivot bearing 170 in place. The inner race 178 the of the pivot bearing 170 is seated on an outer surface 138 of the cylindrical housing 132 of the bearing shaft 62. The inner race 178 of the pivot bearing 170 is held in place on the outer surface 138 of the cylindrical housing 132 by a lock nut 142 threadably received on the shaft end 158 of the cylindrical housing 132. Accordingly, the bearing shaft 62 is supported for pivotal motion in the housing 50. It should be understood that since the bearing shaft 62 pivots, an elastic boot 180 is secured on one end thereof to the bearing shaft 62. The opposite end is secured to a bushing 184 rotatably supported by a bearing assembly 186 within the bearing retainer cap 176. A lock nut 188 is used to secure the bearing assembly 186 to the bushing 184. An oil seal 190 secured within the bearing retainer cap 176 engages the bushing 184 to seal the lubricant within the housing 50. As shown there is sufficient clearance between the interior of the bushing 184 and the bearing shaft 62 to accommodate the total moment of the bearing shaft 62. Accordingly, during rotation of the bearing shaft 62, the corresponding elastic boot 180 and bushing 184 rotate with the bearing shaft 62. It should be appreciated that other types of sealing assemblies that allow the bearing shaft 62 to pivot while maintaining a seal are also within the scope of this invention. Specifically, the elastic boot 180 may remain stationary and have a seal member attached thereto that engages the rotating bearing shaft 62.

Turning now to the pivot arm 110, the arm portion 112 is supported within the cylindrical housing or bearing cup 132 by a plurality of support bearings 192. As shown in FIG. 5, the inner race 194 of the support bearings 192 are secured to the arm portion 112 of the pivot arm 110, while the outer race 196 is secured to the inner surface 135 of the cylindrical housing or bearing cup 132. Accordingly, the pivot arm 110 is supported within the cylindrical housing or bearing cup 132 such that the longitudinal axis 111 of the pivot arm 110 remains coaxial with the longitudinal axis 162 of the bearing shaft 62. Thus, as the pivot arm 110 moves with respect to the output shaft 30, the pivot art 110 is supported by the pivot bearing 170.

It follows then that the pivot bearing 170 must be of a sufficient size and load capacity to support the axial load resulting from reciprocation of the output shaft 30. Further, the range of misalignment of the pivot bearing 170, i.e., the angle that the bearing roller may move or tip before it travels off of the outer race 172 must also be considered.

The invention has been described in an illustrative manner. It is to be understood that the terminology that has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A drive train for use with a kneader apparatus comprising:
   a housing;
   an output shaft, said output shaft supported by said housing for axial and rotational movement;
   a pivot arm having a first end and a second end, said first end of said pivot arm connected to said output shaft;
   a first bearing assembly engaging said second end of said pivot arm;
   a second bearing assembly secured to said housing; and
   a bearing shaft, said bearing shaft disposed between said first bearing assembly and said second bearing assembly, said bearing shaft operative to rotate said first and second bearing assemblies.

2. A drive train as set forth in claim 1 wherein said first bearing assembly includes an inner race secured to said pivot arm, an outer race secured to said bearing shaft and a plurality of bearing rollers disposed between said inner race and said outer race.

3. A drive train as set forth in claim 1 wherein said second bearing assembly includes an inner race secured to said bearing shaft and an outer race secured to said housing, and a plurality of bearing rollers disposed between said inner race and said outer race.

4. A drive train as set forth in claim 1 wherein rotation of said bearing shaft rotates the outer race of said first bearing assembly and the inner race of said second bearing assembly.

5. A drive train as set forth in claim 1 wherein said first bearing assembly is a pivot bearing, said pivot bearing having a plurality of spherical bearing rollers.

6. A drive train as set forth in claim 1 wherein at least one of said first bearing assembly and said second bearing assembly is a self-aligning bearing that will tolerate misalignment.

7. A drive train as set forth in claim 6 wherein said misalignment is up to 3.0 degrees of misalignment from the center line of said self-aligning bearing.

8. A drive train for use with a kneader apparatus comprising:
   a housing;
   an output shaft, said output shaft supported by said housing for axial and rotational movement;
   a pivot arm, said pivot arm having first and second ends, said first end coupled to said output shaft and said second end pivotally supported in said housing by a first bearing assembly and a second bearing assembly wherein at least one of said first bearing assembly and said second bearing assembly is a self-aligning bearing that will tolerate misalignment.

9. A drive train as set forth in claim 8 including a bearing shaft, said bearing shaft disposed between said first bearing assembly and said second bearing assemblies.

10. A drive train as set forth in claim 9 wherein said first bearing assembly is a self-aligning bearing including an inner race, an outer race and a plurality of roller members disposed between said inner race and said outer race;
   said bearing shaft including a bearing cup, said bearing cup having an inner surface and an outer surface, said outer race of said first bearing assembly engaging said inner surface of said bearing cup and said inner race engaging said pivot arm such that rotation of said bearing cup rotates said first bearing assembly.

11. A drive train as set forth in claim 10 wherein said second bearing assembly includes an inner race, an outer race and a plurality of roller members disposed between said inner race and said outer race, said inner race of said second bearing assembly engaging said outer surface of said bearing cup and said outer race of said second bearing assembly engaging said housing such that rotation of said bearing cup rotates the inner race of said second bearing assembly.

12. A drive train as set forth in claim 11 wherein said first bearing assembly includes a plurality of spherical bearing rollers.

13. A drive train for use with a kneader apparatus comprising:
   a housing;
   an output shaft, said output shaft supported by said housing for axial and rotational movement;
   a pivot arm, said pivot arm having first and second ends, said first end coupled to said output shaft and said second end pivotally supported in said housing by a first bearing assembly, said first bearing assembly including an inner race secured to said pivot arm and outer race and a plurality of bearing rollers disposed between said inner race and said outer race; and
   means for rotating said outer race of said first bearing assembly.

14. A drive train as set forth in claim 13 wherein said means for rotating said outer race of said first bearing assembly includes a bearing shaft connected to and operative to rotate said outer race.

15. A drive train as set forth in claim 14 wherein said bearing shaft is rotatably supported within said housing.

16. A drive train as set forth in claim 13 wherein said first bearing assembly is a self-aligning bearing that will tolerate misalignment.

17. A drive train for use with a kneader apparatus comprising:
   a housing;
   an output shaft, said output shaft supported by said housing for axial and rotational movement;
   a pivot arm having a first end and a second end, said first end of said pivot arm connected to said output shaft;
   a pivot bearing engaging said second end of said pivot arm, said pivot bearing being a self-aligning bearing that will tolerate misalignment, said pivot bearing including an inner race, an outer race and a plurality of bearing rollers disposed between said inner race and said outer race, said inner race engaging an arm portion of said pivot arm;
   a bearing shaft, said bearing shaft including a shaft portion and a bearing cup, said bearing cup having an inner surface and an outer surface, said outer race of said pivot bearing engaging said inner surface of said bearing cup;
   a housing bearing, said housing bearing including an inner race, an outer race and a plurality of bearing rollers disposed between said inner race and said outer race, said inner race of said housing bearing engaging said outer surface of said bearing cup and said outer race on said housing bearing engaging and supported by said housing such that rotation of said bearing shaft rotates the outer race of said pivot bearing and the inner race of said housing bearing.

18. A drive train as set forth in claim 17 wherein said plurality of bearing rollers of said pivot bearing are spherical rollers.

19. A drive train for use with a kneader apparatus comprising: a housing;

said first bearing including a support bearing, said support bearing including an inner race, an outer race and a plurality of bearing rollers disposed between said inner race and said outer race, said inner race engaging an arm portion of said pivot arm;

said bearing shaft including a shaft portion and a bearing cup, said bearing cup having an inner surface and an outer surface, said outer race of said support bearing engaging said inner surface of said bearing cup;

said second bearing assembly including a pivot bearing, said pivot bearing being a self-aligning bearing that will tolerate misalignment, said pivot bearing including an inner race, an outer race and a plurality of bearing rollers disposed between said inner race and said outer race, said inner race engaging said outer surface of said bearing cup and said outer race of said pivot bearing engaging and supported by said housing such that rotation of said bearing shaft rotates said inner race of said pivot bearing and the outer race of said support bearing.

20. A drive train as set forth in claim 19 including a boot attached at one end thereof to said shaft portion of said bearing shaft and on the opposite end thereof to said housing.

* * * * *